US012743466B1

(12) United States Patent
Lizcano et al.

(10) Patent No.: US 12,743,466 B1
(45) Date of Patent: Sep. 22, 2026

(54) FINE-GRAINED SEGMENTATION OF CONTENT ITEMS FOR TIERED CLOUD ARCHIVAL USING MACHINE-LEARNED MODELS

(71) Applicant: Charter Communications Operating, LLC, St. Louis, MO (US)

(72) Inventors: Leonardo Lizcano, Littleton, CO (US); Jay Shah, Parker, CO (US); Erdogan Simsek, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 19/171,571

(22) Filed: Apr. 7, 2025

(51) Int. Cl.

| | |
|---|---|
| ***G06F 16/00*** | (2019.01) |
| ***G06F 16/22*** | (2019.01) |
| ***G06F 16/783*** | (2019.01) |
| ***G06N 20/00*** | (2019.01) |
| ***H04N 21/231*** | (2011.01) |

(52) U.S. Cl.
CPC ........ *G06F 16/783* (2019.01); *G06F 16/2237* (2019.01); *G06N 20/00* (2019.01); *H04N 21/23109* (2013.01)

(58) Field of Classification Search
None
See application file for complete search history.

(56) References Cited

U.S. PATENT DOCUMENTS

| | | | | |
|---|---|---|---|---|
| 2025/0077793 | A1* | 3/2025 | Colgan | G06F 16/3347 |
| 2025/0284732 | A1* | 9/2025 | O'Neill | G06F 16/435 |
| 2026/0030274 | A1* | 1/2026 | Croskey | G06F 16/33295 |
| 2026/0064787 | A1* | 3/2026 | Goyal | G06F 16/9535 |

* cited by examiner

*Primary Examiner* — Bai D Vu
(74) *Attorney, Agent, or Firm* — Dority & Manning, P.A.

(57) ABSTRACT

Responsive to a request to store a content item for a user of a content service, user metadata and content item metadata are processed with a machine-learned embedding model to obtain a query embedding. A vector similarity search is performed on a vector database with the query embedding to retrieve a stored embedding matching the query embedding, wherein the stored embedding represents a contextual data element related to playback of the content item. A set of inputs is processed with a machine-learned Large Foundation Model to obtain an item storage decision output that identifies a segmentation point at which to segment the content item into first and second segments, wherein the item storage decision output further identifies first and second storage repositories for the first and second segments. The first segment is stored to the first storage repository and the second segment is stored to the second storage repository.

20 Claims, 5 Drawing Sheets

FINE-GRAINED SEGMENTATION OF CONTENT ITEMS FOR TIERED CLOUD ARCHIVAL USING MACHINE-LEARNED MODELS

BACKGROUND

Cloud storage services are used by most organizations for data storage and retrieval. Cloud storage services generally implement multi-tiered services in which different classes of storage are provided to accommodate varying data access requirements. Storage classes can differ in factors such as retrieval speed, data retention policies, data retrieval costs, etc. For example, one service offered by a cloud storage service provider may provide high-speed retrieval, while offering another service that provides lower-speed retrieval for lower costs.

SUMMARY

Implementations described herein facilitate granular segmentation and storage of content items to mixed storage repositories, therefore optimizing storage costs while minimizing negative impacts to users.

In one implementation, a method is provided. The method includes, responsive to a request to store a content item for a user of a content service, processing, by a computing system comprising one or more processor devices, user metadata and content item metadata with a machine-learned embedding model to obtain a query embedding. The method further includes performing, by the computing system, a vector similarity search on a vector database with the query embedding to retrieve a stored embedding matching the query embedding, wherein the stored embedding represents a contextual data element related to playback of the content item. The method further includes processing, by the computing system, a set of inputs comprising the contextual data element, the user metadata, and the content item metadata with a machine-learned model to obtain an item storage decision output that identifies a segmentation point at which to segment the content item into a first segment and a second segment, and wherein the item storage decision output further identifies a first storage repository for the first segment and a second storage repository for the second segment. The method further includes storing, by the computing system, the first segment to the first storage repository and the second segment to the second storage repository.

In another implementation, a computing system is provided. The computing system includes a memory, and one or more processor devices coupled to the memory. The processor device(s) are to, responsive to a request to store a content item for a user of a content service, process user metadata and content item metadata with a machine-learned embedding model to obtain a query embedding. The processor device(s) are further to perform a vector similarity search on a vector database with the query embedding to retrieve a stored embedding matching the query embedding, wherein the stored embedding represents a contextual data element related to playback of the content item. The processor device(s) are further to process a set of inputs comprising the contextual data element, the user metadata, and the content item metadata with a machine-learned model to obtain an item storage decision output that identifies a segmentation point at which to segment the content item into a first segment and a second segment, and wherein the item storage decision output further identifies a first storage repository for the first segment and a second storage repository for the second segment. The processor device(s) are further to store the first segment to the first storage repository and the second segment to the second storage repository.

In another implementation, a non-transitory computer-readable storage medium is provided. The non-transitory computer-readable storage medium includes executable instructions to cause one or more processor devices to, responsive to a request to store a content item for a user of a content service, process user metadata and content item metadata with a machine-learned embedding model to obtain a query embedding. The instructions further cause the processor device(s) to perform a vector similarity search on a vector database with the query embedding to retrieve a stored embedding matching the query embedding, wherein the stored embedding represents a contextual data element related to playback of the content item. The instructions further cause the processor device(s) to process a set of inputs comprising the contextual data element, the user metadata, and the content item metadata with a machine-learned model to obtain an item storage decision output that identifies a segmentation point at which to segment the content item into a first segment and a second segment, and wherein the item storage decision output further identifies a first storage repository for the first segment and a second storage repository for the second segment. The instructions further cause the processor device(s) to store the first segment to the first storage repository and the second segment to the second storage repository.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
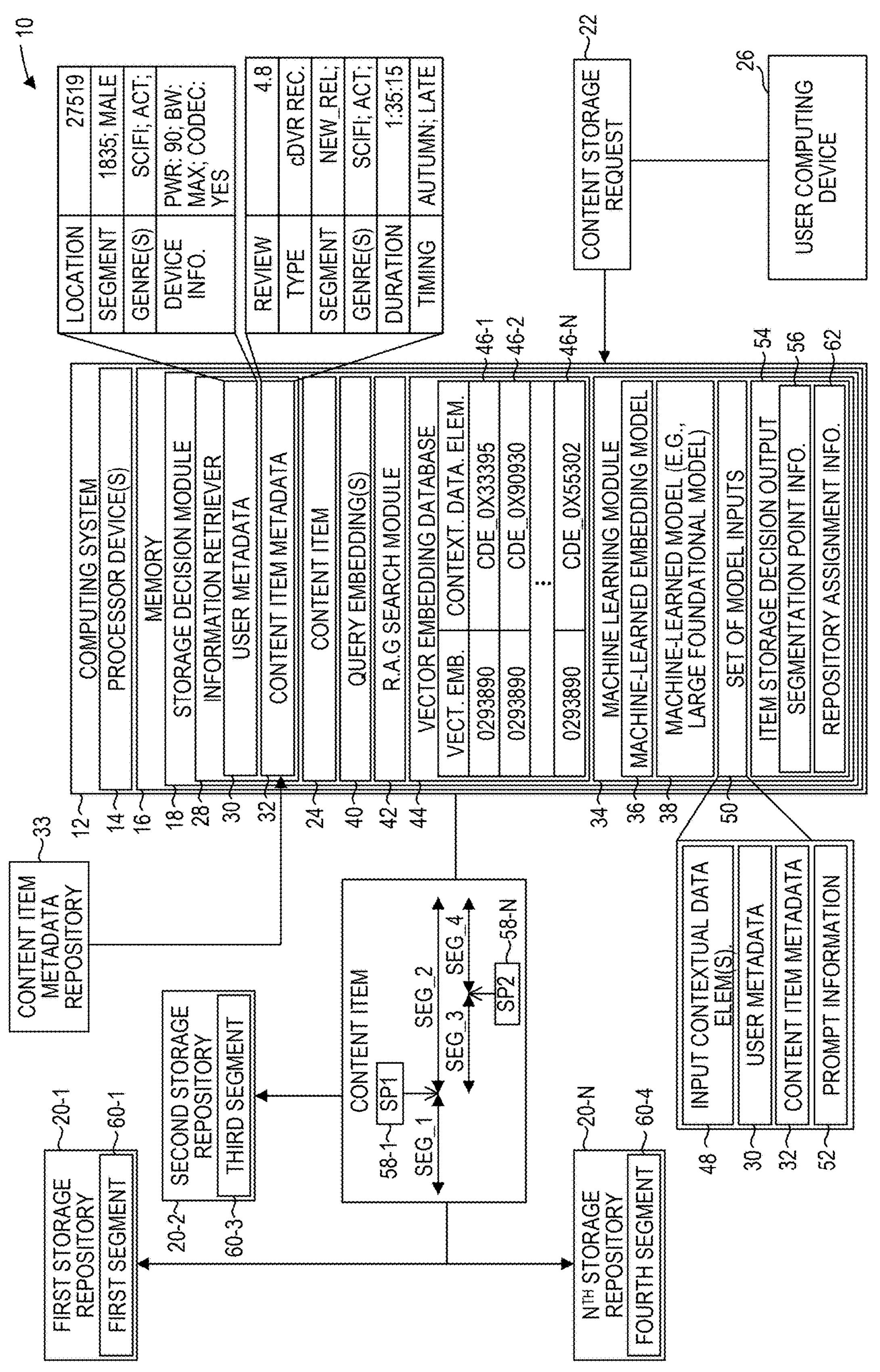
FIG. 1 is a block diagram of a computing environment suitable for implementing segmentation of content items for tiered cloud archival using machine-learned models according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Cloud storage services are used by most organizations for data storage and retrieval. Cloud storage services generally implement multi-tiered services in which different classes of storage are provided to accommodate varying data access requirements. Storage classes can differ in factors such as retrieval speed, data retention policies, data retrieval costs, etc. For example, one service offered by a cloud storage service provider may provide high-speed retrieval, while offering another service that provides lower-speed retrieval for lower costs.

As a specific example, cloud storage providers such as Amazon® Web Services (AWS) provide multiple types of storage repositories (i.e., services). One example is AWS S3® storage repositories, which provides high-speed data retrieval in exchange for a relatively high storage cost and a relatively low retrieval cost. Another example is AWS S3 Glacier® storage repositories, which provide high-speed data retrieval in exchange for a relatively low data storage cost and a relatively high data retrieval cost. Given the different costs associated with various storage repositories, the anticipated use-case for data (e.g., whether the data will be retrieved often, etc.) is an important factor to consider when selecting a particular storage repository.

It should be noted that, as described herein, a "storage cost" includes both the cost to store the content item to the repository (e.g., monetary costs, computational resource costs, etc.), and the cost to retrieve the content item (e.g., monetary costs, computational resource costs, etc.). For example, if a data item is frequently retrieved from a storage repository with low costs for data storage and high costs for data retrieval, the "storage cost" for the repository may be higher than the "storage cost" for a different storage repository with high costs for data storage and low costs (or none) for data retrieval.

In modern system architectures, it is common for cloud storage repositories to be employed alongside "on-premises" storage repositories. As described herein, a "cloud" storage repository refers to a cloud storage repository provided by a third-party cloud storage provider. An on-premises storage repository refers to physical or virtualized storage resources that belong to a particular organization. For example, a technology company may physically implement on-premises storage repositories from their company headquarters, while also subscribing to cloud storage repositories from a third-party cloud storage provider.

An example use-case of this hybrid architecture is for content services (e.g., cable television services, streaming services, internet television services, etc.). Content services often provide "content-on-demand" services, such as Video-on-demand or cloud Digital Video Recorder (cDVR) services. These services function by storing digital media content items (e.g., movies, television shows, recordings, video games, etc.) for users. In particular, a cDVR service can record a content item for a user and store the content item to a storage repository for "on-demand" retrieval by the user. In a hybrid architecture, the content service may first store the content item in an on-premises repository. On-premises repositories are generally designed to provide high-speed data retrieval, so that users can quickly access requested content items with minimal latency. Alternatively, content services may instead use an analogous cloud storage repository that offers high-speed data retrieval.

Storage repositories that offer high-speed data retrieval (e.g., on-premises repositories, certain cloud repositories, etc.) generally have high storage costs (e.g., a computational resource cost per unit of time, a monetary cost per unit of time, etc.). Content services generally wish to migrate content items from high-cost storage repositories to low-cost storage repositories to save resources. However, low-cost storage repositories exhibit various inefficiencies. For example, some low-cost storage repositories provide relatively low data retrieval speeds. When a content item is retrieved for a user, these lower speeds can introduce an element of latency that is disruptive to users. For another example, other low-cost storage repositories offer high data retrieval speeds with high data retrieval costs. When a content item is retrieved from the repository, the content service will incur a high storage cost for the retrieval. Without the capacity to determine an optimal threshold for migrating a content item, many content services cannot benefit from the advantages provided by content item migration.

This problem is exacerbated in geographic areas with regulatory structures that necessitate storing unique copies of content items for each user (e.g., five users recording a sports game would require 5 separate recordings for the users), which in turn leads to prohibitively large content storage requirements. However, storing user-specific copies of content items also enables content services to make granular, user-specific decisions for segmenting and storing portions of content items using different types of storage repositories. As such, a technique to make optimal segmentation and storage decisions for content items based on user-specific and content-specific features is desired.

Accordingly, implementations described herein propose granular segmentation of content items for tiered cloud archival using machine-learned models. More specifically, a computing system associated with a content service can receive a request to store a content item for a user of a content service. The computing system can process user-specific metadata (e.g., user age, location, preferences, historical viewing patterns, etc.) and content-specific metadata (e.g., release date for the content item, an average review score, format, genre, etc.) to generate a query embedding. The computing system can use the query embedding to perform a similarity search on a vector database to retrieve a stored embedding matching the query embedding. The stored embedding can represent a contextual data element related to playback of the content item. For example, the stored embedding may correspond to a data item describing historical playback patterns for users consuming content items from the same genre, or from users similar to the requesting user.

Once retrieved, the computing system can process a set of inputs including the contextual data element, the user metadata, and the content item with a machine-learned model, such as a Large Foundational Model (LFM) (e.g., a Large Language Model (LLM, etc.). The model can generate an item storage decision output that identifies a segmentation point in the content item. The segmentation point can identify a point at which to segment the content item into first and second segments. For example, if the content item is a video, the segmentation point can refer to a particular playback time (e.g., 00:35:15) in the video at which to segment the video.

The item storage decision output can also identify a target storage repository for each segment of the content item (e.g., a first storage repository for the first segment, a second storage repository for the second segment, etc.). As described previously, the target storage repositories can have different capabilities and/or costs associated with storage and retrieval of content items. The machine-learned model can generate an item storage decision output that minimizes costs associated with storage and retrieval of the content item.

For example, assume that the machine-learned model processes the set of inputs and identifies a segmentation point at which the user is unlikely to view a remainder of the content item. The machine-learned model can generate an output that suggests storing a first segment of the content item in a storage repository with high retrieval speeds, high storage costs, and low retrieval costs, as the user is relatively likely to retrieve the first segment of the content item. The output can further suggest storing a second segment of the content item in a storage repository with high retrieval speeds, low storage costs, and high retrieval costs, as the user is unlikely to retrieve the first segment of the content item, and would be negatively impacted by a slow retrieval speed. In such fashion, implementations described herein can make granular, user-specific and/or content-specific segmentation and storage decisions to optimize content item storage while minimizing related costs.

Aspects of the present disclosure provide a number of technical effects and benefits. As one example technical effect and benefit, as described above, implementations described herein can enable content services (and/or other services) to utilize content item migration to substantially reduce costs and/or resource utilization while minimizing disruptions and additional costs associated with content item retrieval from low-cost storage repositories.

FIG. 1 is a block diagram of a computing environment 10 suitable for implementing segmentation of content items for tiered cloud archival using machine-learned models according to some implementations of the present disclosure. A computing environment 10 can include a computing system 12 with one or more processor device(s) 14 and a memory 16. As described herein, the "computing environment" 10 can be any type or manner of computing environment (e.g., a collection of computing devices, systems, and related infrastructure associated with a particular entity or organization), such as a "confidential" computing environment in which sensitive data and code is protected during processing, a "public" computing environment, etc. For example, the computing environment 10 can be or otherwise include a confidential computing "enclave" that leverages hardware-based execution environments and secure virtualization technologies, such as memory encryption, to isolate critical computations and prevent unauthorized access to data while in use. For another example, the computing environment 10 can be a distributed computing environment that utilizes computing resources across a variety of different types of devices (e.g., servers, virtualized devices, user devices, Internet-of-Things (IoT) devices, etc.).

Additionally, or alternatively, in some implementations, the computing environment 10 can be a cloud computing environment implemented using the computing system 12. For example, the computing system 12 can implement a cloud computing platform by implementing a variety of cloud modules to provide cloud functionality. The cloud computing platform implemented by the computing system 12 can be utilized by various users, entities, organizations, devices, etc. within (and/or external to) the computing environment 10.

Specifically, in some implementations, the computing environment 10 can be a computing environment associated with a content service. As described herein, a content service is any type of service that provides access to content items (e.g., cDVR recordings, video games, Augmented Reality (AR)/Virtual Reality (VR) content, video on demand, etc.). The computing environment 10 can include any type of computing resources or software resources necessary for distributing content items, such as content distribution networks (CDNs), storage repositories, network infrastructure, etc.

In some implementations, the computing system 12 may be a computing device that includes multiple computing devices (i.e., a computing system). Alternatively, in some implementations, the computing system 12 may be one or more computing devices within a computing system that includes multiple computing devices. Similarly, the processor device(s) 14 may include any computing or electronic device capable of executing software instructions to implement the functionality described herein.

The memory 16 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 16 can include a containerized unit of software instructions (i.e., a "packaged container"). The containerized unit of software instructions can collectively form a container that has been packaged using any type or manner of containerization technique.

A containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

In particular, the memory 16 can include one or more storage repositories. As described herein, a "storage repository" refers to either an "on-premises" storage repository (e.g., a repository implemented at one or more physical locations associated with a content service) or a cloud-based storage repository (e.g., a repository implemented via a mix of physical and virtualized resources, generally in a distributed fashion). A cloud-based storage repository can refer to either a first-party cloud storage repository or a third-party cloud storage repository (e.g., a cloud storage repository implemented by a cloud storage provider). As such, in some instances, the physical resources of an on-premises storage repository may implement a first-party cloud storage repository.

In some implementations, the computing environment 10 can include multiple types of nodes. As described herein, a "node" generally refers to a discrete unit of hardware and/or software resources. In some instances, nodes within the computing environment 10 can be configured to perform specific tasks. For example, some nodes within the computing environment 10 can be configured as "compute" or "processing" nodes that handle processing tasks or provide processing-heavy services. Compute nodes are generally allocated with hardware devices that can facilitate processing tasks, such as Graphics Processing Units (GPUs), Central Processing Units (CPUs), Application-specific Integrated Circuits (ASICs), Field-Programmable Gate Arrays (FPGAs), etc.

Conversely, storage nodes can be allocated with hardware devices to facilitate storage tasks, such as storage devices (e.g., hard drives, etc.), memory, high-bandwidth network devices, physical storage media, etc.). It should be noted that in some instances, storage nodes can include processing devices (e.g., CPUs, etc.) to facilitate storage operations (e.g., read/write operations) and processing nodes can include storage devices (e.g., random access memory) to facilitate processing operations.

The memory 16 can include a storage decision module 18. The storage decision module 18 can handle storage and retrieval of content items. To do so, the storage decision module 18 can be operable to interface with first-party storage repositories and/or third-party storage repositories. Specifically, the storage decision module 18 can include, or can communicate with, storage repositories 20-1-20-N (generally, storage repositories 20). For example, although the first storage repository 20-1 is illustrated as being external to the storage decision module 18, in some implementations, the first storage repository 20-1 can be a first-party storage repository implemented using the memory 16 (or some other memory device). Alternatively, the first storage repository 20-1 may be a third-party storage repository accessed by the storage decision module 18 via an Application Programming Interface (API). In some implementations, the storage repositories 20 can include a storage repository with high-speed data retrieval and high storage costs, and low (or no) retrieval costs, such as an on-premises storage repository or an Amazon S3® storage repository. For example, a content item segment that a user is very likely to retrieve in the near future may be optimally placed in such a repository, as the high storage costs will be less impactful due to the likely near-term retrieval, and the high-speed data retrieval is necessary to avoid negatively impacting the user with perceivable latency.

Additionally, or alternatively, in some implementations, the storage repositories 20 can include a storage repository with low-speed data retrieval, high storage costs, and low (or no) retrieval costs. For example, a content item segment that a user is very unlikely to retrieve in the near future may be optimally placed in such a repository, as the high storage costs will be less impactful due to the likely near-term retrieval, and the low-speed data retrieval is very unlikely to negatively impact the user (or can be mitigated by retrieving the segment while transmitting a preceding segment). Additionally, or alternatively, in some implementations, the storage repositories 20 can include a storage repository with high-speed data retrieval, low storage costs, and high retrieval costs. For example, a content item segment that a user is moderately likely to retrieve in the near future may be optimally placed in such a repository, as the low storage costs will be less impactful if the user does not retrieve the item, and the high-speed data retrieval may be necessary to avoid negatively impacting the user with perceivable latency.

The storage decision module can obtain a content storage request 22. The content storage request 22 can request storage of a content item 24 for a user. For example, the content storage request 22 may be transmitted by a user computing device 26 associated with the particular user (e.g., the user's smartphone, laptop, etc.). Alternatively, in some implementations, the content storage request 22 can be received from some other entity, such as another module of the computing system 12 (e.g., a live streaming module), a streaming service, the content service associated with the computing system 12, etc. For example, a broadcasting entity (e.g., a module, service, third-party broadcaster, etc.) may send the content storage request 22 from a user currently viewing a live broadcast of the content item 24. For another example, a computing system associated with a broadcast service partnered with the content service may transmit the content storage request 22 to the computing system 12 for the user.

The storage decision module 18 can include an information retriever 28. The information retriever 28 can obtain information related to the storage decision to be made by the storage decision module 18. More specifically, the information retriever 28 can obtain user metadata 30 for the user of the content service (e.g., the user associated with the content storage request 22). The user metadata 30 can describe features and/or historical behaviors of the user in an anonymized fashion that preserves user privacy. Examples of such information can include a user's current location, place of residence, demographic information (e.g., gender, age, ethnicity, etc.), preferences (e.g., genres or other content classifications for which the user has demonstrated a preference, user-specified preferences, etc.), historical user retrieval information (e.g., records of instances in which the user retrieved a similar content item), historical retrieved item viewing information (e.g., the percentage of similar content items viewed by the user after retrieval), etc.

For example, the user metadata 30 may include segment identifying information that identifies the particular user segment(s) (i.e., demographic groups, etc.) to which the user belongs. To follow the depicted example, the user can belong to a segment of users aged 18-35, and another segment of users who are male. For another example, the user metadata 30 may include location information for a user computing device associated with the user. To follow the depicted example, the user metadata 30 can include location information specifying a current location (e.g., a ZIP code of 27519) for the user computing device 26 associated with the user. For yet another example, the user metadata 30 can include device information descriptive of a current state of the user computing device 26 associated with the user. To follow the depicted example, the user metadata 30 can include device information indicating 90% remaining battery life, a maximum bandwidth capability (e.g., a capability above some threshold value), and a particular codec playback capability (e.g., codecs supported by the user computing device 26).

The information retriever 28 can also retrieve content item metadata 32 for the content item 24. The content item metadata 32 can describe features of the content item and/or aggregate behaviors of users when retrieving the content item. For example, the information retriever 28 may retrieve the content item metadata 32 from a content item metadata repository 33 (e.g., a database for a content provider, the content service, the creator or owner of the content item, etc.). Examples of such information can include locations associated with users who prefer the content item, demographic information for users who prefer the content item genres or other content classifications associated with the content item, aggregate user retrieval information (e.g., records of instances in which other users retrieved the content item), historical retrieved item viewing information (e.g., the percentage of the content item viewed by other users after retrieval), etc.

For example, the content item metadata 32 can include item identifying information that identifies the particular content segment to which the content item belongs. The item identifying information can include any type of content classification, and in some implementations, may include multiple "tiers" or hierarchical classifications. To follow the depicted example, the content item metadata can be assigned to the "new releases" segment of content items, and can also be classified as belonging to both the "scifi" and "action" genres. For another example, the content item metadata 32 can include review information descriptive of reviewer scores and/or an aggregate score assigned to the content item. To follow the depicted example, the content item metadata 32 can include an average user review of 4.8/5.0 for the content item 24.

For another example, the content item metadata 32 can include item type information indicative of a particular content type associated with the content type. As described herein, a "content type" refers to the format or data type with which a content type is encoded. Examples include video content, audio content, audiovisual content, cDVR recordings, video games, Augmented Reality (AR)/Virtual Reality (VR) content, video on demand, etc. To follow the depicted example, the content item metadata 32 can indicate that the content item 24 is a cloud DVR recording. For another example, the content item metadata 32 can include temporal information descriptive of a seasonality of the content item and/or an expected playback time of the content item. To follow the depicted example, the content item metadata 32 can indicate that the content item 24 is typically viewed in Autumn and/or late in the evening.

For yet another example, the content item metadata 32 can include playback information descriptive of a playback duration for the content item 24. For example, the content item metadata 32 can indicate that the duration of the content item 24 is 1 hour, 35 minutes, 15 seconds. If the content item 24 is of a content type without a clear "duration," such as a video game or AR/VR asset, the playback duration for the content item can refer to an estimated session playtime or "completion time" (e.g., the estimated time required to complete a primary objective in a video game, etc.).

The storage decision module 18 can include a machine learning module 34. The machine learning module 34 can include a machine-learned embedding model 36 and a machine-learned model 38. The machine-learned model 38 will be discussed in greater detail subsequently. The machine-learned embedding model 36 can be any type or manner of machine-learned encoding model that is trained to process an input and output an intermediate representation of the input.

In some implementations, the machine-learned embedding model 36 can be a multi-headed model or some other type of model capable of processing multiple types of data to generate intermediate representations. For example, the machine-learned embedding model 36 may include one embedding model for generating embeddings of video inputs and another embedding model for generating embeddings of text inputs. The resulting embeddings may be stored a shared embedding space in a vector database, or to separate embedding spaces for specific data types (e.g., an embedding space for text embeddings, an embedding space for visual embeddings, etc.).

Alternatively, in some implementations, the machine-learned embedding model 36 can include a single embedding model trained to generate the same manner of embeddings for multiple types of data (or multimedia inputs). In other words, the machine-learned embedding model 36 can be a model that generates embeddings for different data types within the same shared embedding space. For example, assume that the content item metadata 32 includes textual data describing the content item 24 as belonging to the "scifi" genre. The machine-learned embedding model 36 can process the textual data to generate an embedding that represents the textual data. If stored to a vector database that stores embeddings for multiple data types, the generated embedding might be located relatively close (e.g., due to semantic similarity) to other embeddings in the vector database representing images or video clips from scifi movies, audio from scifi movies, etc.

In particular, the storage decision module 18 can utilize the machine-learned embedding model 36 to generate one or more query embedding(s) 40. The query embedding(s) 40 can be embedding(s) for the input(s) to the machine-learned embedding model 36. In other words, the machine-learned embedding model 36 can generate intermediate representations as an output for corresponding inputs to the model. For example, the machine-learned embedding model 36 may process the user metadata 30 and the content item metadata 32 to separately generate a user query embedding for the user metadata 30 and an item query embedding for the content item metadata 32, respectively. For another example, the machine-learned embedding model 36 may process the user metadata 30 and the content item metadata 32 to generate a single query embedding that jointly represents both the user metadata 30 and the content item metadata 32.

The storage decision module 18 can include a Retrieval Augmented Generation (RAG) search module 42 and a vector embedding database 44. The RAG search module 42 can be used to perform RAG to search the vector embedding database 44. As described herein, RAG refers to any conventional process for accessing information from a database for a generative model to use when generating an output. The RAG search module 42 can perform RAG by performing a vector similarity search (i.e., querying) the vector embedding database 44 with the query embedding(s) 40 to retrieve one or more embeddings matching the query embedding(s) 40.

The vector embedding database 44 can be populated with vector representations of contextual data elements 46-1-46-N (generally, contextual data elements 46) related to playback of the content item. As described herein, a "contextual data element" can refer to any type or manner of information that relates to playback and/or of the content item 24. In some implementations, contextual data elements can include aggregated playback behavior information for a plurality of users of the content service. The aggregated playback behavior information can describe aggregated behavior for all content items or a subset of content items (e.g., content items belonging to the same item segment as the content item 24, content items viewed by the same user segments as those the user belongs to, etc.). The behavior described by the information can include an average view time after retrieval (e.g., an average length of time users consumed a content item after it was retrieved), an average "stopping point" (e.g., a point at which users stopped consuming a content item after retrieval), etc.

In some implementations, the contextual data elements can include item-related contextual data elements. As described herein, an "item-related" contextual data element refers to a data element that relates to the content item 24 or a grouping of content items similar to the content item 24. For example, if the content item 24 is a science fiction movie, a contextual data element describing aggregate user behavior when retrieving science fiction movies may be described as an item-related data element. Additionally, or alternatively, in some implementations, the contextual data elements can include user-related contextual data elements. As described herein, a "user-related" contextual data element refers to a data element that relates to the user of the content service or a grouping of users similar to the user. For example, if the user is an 18-35 year old male, a contextual data element describing aggregate user behavior for users between the ages of 18-35 when retrieving content items may be described as a user-related data element.

In some implementations, the contextual data elements 46 can include information descriptive of historical playback behavior for the user of the content service for any type of content item previously retrieved by the user. Additionally, or alternatively, in some implementations, the contextual data elements 46 can include information descriptive of aggregate playback behavior for a plurality of different items provided by the content service. Additionally, or alternatively, in some implementations, the contextual data elements 46 can include information descriptive of aggregate playback behavior for the content item 24, and/or content items similar to the content item 24.

The RAG search module 42 can perform the vector similarity search on the vector embedding database using the query embedding(s) 40 to retrieve one or more of the vector embeddings similar to the query embedding(s) 40. It should be noted that, as described herein, a vector embedding can "match" the query embedding if the vector embedding is within a certain degree of similarity to the query embedding, is one of the N most similar vector embeddings to the query embedding within the vector embedding database, etc. As such, a vector embedding can "match" a query embedding even if the embeddings are similar but not identical. For example, to perform the vector similarity search, the RAG search module 42 may evaluate a cosine similarity between the query vector and each of the vector embeddings to compute a cosine similarity score for each of the vector embeddings. The RAG search module 42 may retrieve the vector embeddings with a similarity score above a threshold score. Alternatively, the RAG search module 42 may retrieve a number of vector embeddings with the highest similarity scores.

Once identified, the RAG search module 42 can retrieve the contextual data elements 46 that correspond to the identified vector embedding(s). In embedding spaces such as the vector embedding database 44, "distance" between points (e.g., embeddings) in the database can serve as a heuristic metric for similarity, with embeddings representing contextual data elements that are most similar to each other being located close together within the database. As such, in some instances, the RAG search module 42 can select the contextual data elements 46 based on the distance between their corresponding embeddings and the query embedding(s) 40 within the vector embedding database 44.

By performing the vector similarity search on the vector embedding database 44 with the query embedding(s) 40, the RAG search module 42 can identify one or more input contextual data elements 48 from the contextual data elements 46 for inclusion in a set of model inputs 50. The set of model inputs 50 can be inputs for the machine-learned model 38. In some implementations, the machine-learned model 38 can be a Large Foundational Model (LFM). As described herein, a "large foundational model" refers to any type of model that includes a sufficient number of parameters to enable the performance of multiple types of tasks. One example of a LFM is an LLM, which typically includes large numbers of parameters that enable the model to perform a variety of language-related tasks.

The set of model inputs 50 can include the input contextual data element(s) 48. In some implementations, the set of model inputs 50 can also include the user metadata 30 and/or the content item metadata 32. In some implementations, the set of model inputs 50 can include prompt information 52. The prompt information 52 can include instructions that instruct the machine-learned model 38 to generate an item storage decision output 54 that segments the content item 24 and assigns the segments of the content item 24 to different repositories of the storage repositories 20.

More specifically, the machine-learned model 38 can process the set of model inputs 50 to generate the item storage decision output 54. The item storage decision output 54 can include segmentation point information 56. The segmentation point information 56 can define one or more segmentation points 58-1-58-N (generally, segmentation point(s) 58). The segmentation point(s) 58 can refer to locations at which the content item 24 can be segmented into discrete item segments 60-1-60-N (generally, item segments 60).

It should be noted that the segmentation point(s) 58 can refer to different types of locations or places within the content item 24 based on the content type associated with the content item 24 (e.g., a video file, a video game, an AR/VR asset, etc.). For example, if the content item 24 is an audio and/or video file, the segmentation point can refer to a timestamp (e.g., at 00:03:15), a video frame number, a keyframe reference, an event-based description (e.g., "the moment at which the conflict is resolved"), etc. If the content item 24 is a video game, the segmentation point can refer to an event-based point (e.g., at the end of level 5), gameplay milestones, objective completion points, etc. In some implementations, the segmentation point(s) 58 can be type-agnostic or format-agnostic with respect to the content type of the content item 24. For example, if the content item 24 has a file size of 2 GB, the segmentation point may be a byte offset that segments the content item 24 after 1,073,741,824 bytes (e.g., 1 GB of bytes).

The item storage decision output 54 can further include repository assignment information 62. The repository assignment information 62 can assign each of the item segments 60 to a particular storage repository of the storage repositories 20. To follow the depicted example, the segmentation point 58-1 can segment the content item 24 into a first item segment 60-1 and a second item segment 60-2 (not illustrated). The segmentation point 60-2 can segment the second item segment 60-2 into a third item segment 60-3 and a fourth item segment 60-N. The repository assignment information 62 can assign the first segment 60-1 to the first storage repository 20-1, the third segment 60-3 to the second storage repository 20-2, and the fourth segment 60-4 to the $N^{th}$ storage repository 20-N.

In some implementations, the item storage decision output 54 can be generated to minimize costs associated with storage of the item segments 60 within the storage repositories 20. More specifically, in some implementations, the prompt information 52 can define an objective for the machine-learned model to pursue or maximize with the item storage decision output 54. For example, the prompt information 52 may include instructions to minimize a total storage cost associated with storing the content item. For another example, the prompt information 52 may include cost information descriptive of a plurality of storage costs respectively associated with the plurality of candidate storage repositories.

In some implementations, the prompt information 52 can define costs associated with the storage repositories 20. The prompt information can further instruct the machine-learned model to segment the content item 24 as necessary, and then assign the segments of the content item 24 to the storage repositories 20 such that total costs are minimized.

Figure 2:
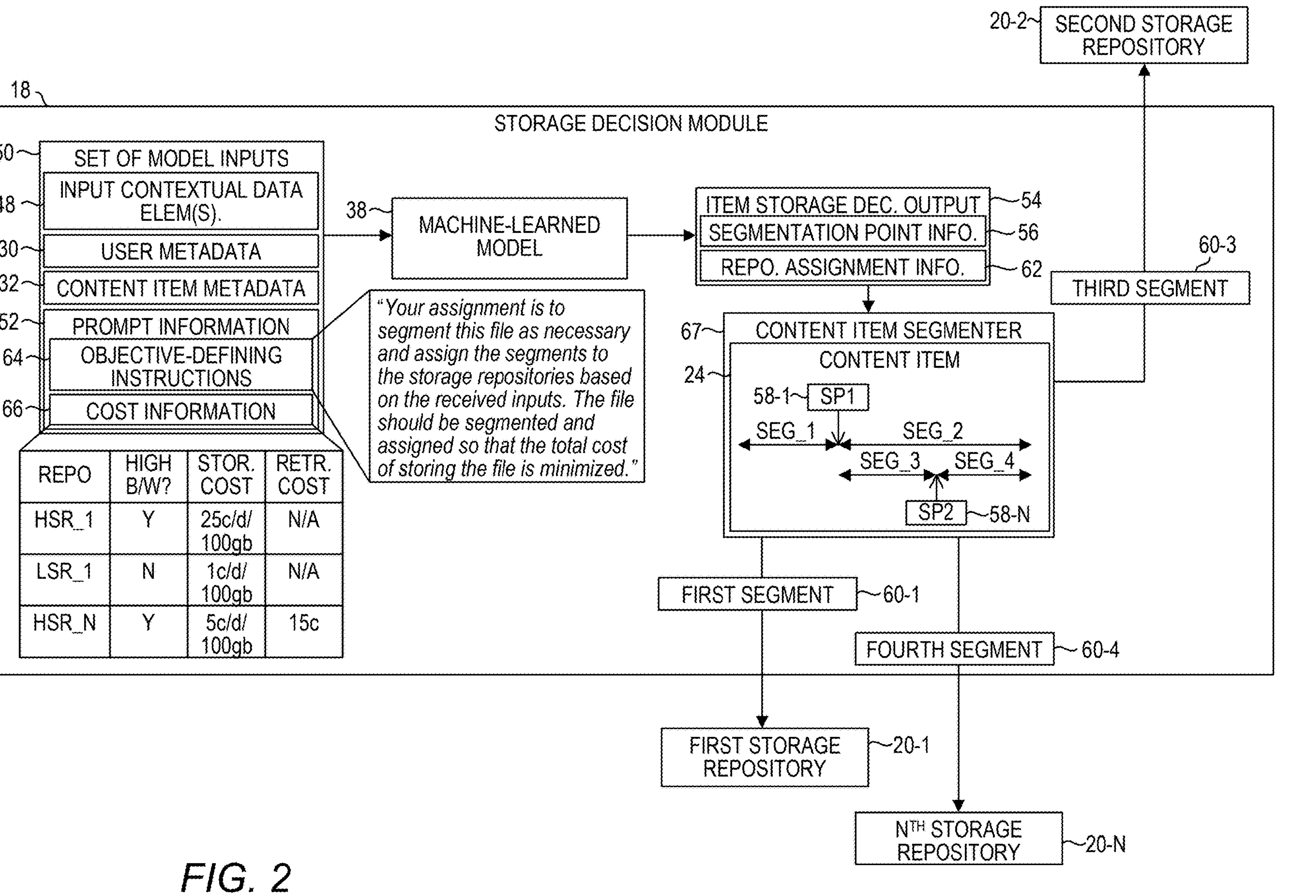
FIG. 2 is a data flow diagram for generating the item storage decision output with the machine-learned model (e.g., a Large Foundational Model (LFM)) of FIG. 1 according to some implementations of the present disclosure.

For a specific example, turning to FIG. 2, FIG. 2 is a data flow diagram for generating the item storage decision output 54 with the machine-learned model 38 of FIG. 1 according to some implementations of the present disclosure. FIG. 2 will be discussed in conjunction with FIG. 1. More specifically, the storage decision module 18 can process the set of model inputs 50 with the machine-learned model 38. The set of model inputs 50 can include the prompt information 52.

In some implementations, the prompt information 52 can include objective-defining instructions 64. The objective-defining instructions 64 can define an objective for the machine-learned model 38 to fulfill when segmenting and assigning the content item 24 to the storage repositories 20. For example, the objective-defining instructions 64 may define an objective that minimizes the likelihood the user will experience latency due to retrieving the content item 24 (or segment thereof) from a low-speed repository. For another example, the objective-defining instructions 64 may define an objective that minimizes the total cost associated with storage and retrieval of the content item 24. In some implementations, the objective-defining instructions 64 can define multiple objectives. For example, the objective-defining instructions 64 can instruct the machine-learned model to minimize total costs associated with storage and retrieval of the content item 24 while ensuring the likelihood the user will experience latency is less than a threshold value.

In some implementations, the prompt information 52 can include cost information 66. The cost information 66 can provide cost information that the machine-learned model 38 can use in conjunction with the objective-defining instructions 64. For example, if the objective-defining instructions 64 define an objective to minimize total costs associated with storage of the content item 24, the cost information 66 can define such costs. To follow the depicted example, the cost information can indicate whether a storage repository is a "high-speed" or "high-bandwidth" (e.g., so that retrieving a file from the repository will not introduce perceivable latency). The cost information 66 can further indicate a storage cost for an amount of storage per unit of time (e.g., 5 cents per day per 100 gigabytes, etc.). The cost information 66 can further indicate a retrieval cost for some (or all) of the storage repositories. Retrieval costs are typically low or nonexistent except for certain repositories that also offer high-speed retrieval and low storage costs. As such, repositories with high retrieval costs, high-speed retrieval, and low storage costs are appropriate for content items (or segments thereof) that are relatively unlikely to be retrieved.

The machine-learned model can process the set of model inputs 50, including the objective-defining instructions 64 and the cost information 66, to generate the item storage decision output 54. The item storage decision output 54 can include the segmentation point information 56 and the repository assignment information 62. The storage decision module 18 can include a content item segmenter 67. The content item segmenter 67 can segment the content item 24 at the segmentation points 58-1 and 58-N (as indicated by the segmentation point information 56) to obtain first item segment 60-1, third item segment 60-3, and fourth item segment 60-4. The content item segmenter 67 (or some other module that facilitates communications) can transmit the item segments 60 to their assigned storage repositories 20 (as indicated by the repository assignment information 62).

Returning to FIG. 1, the storage decision module 18 can assign the item segments 60 to the storage repositories 20 as described with regards to FIG. 2. To follow the depicted example, the content item 24 can be segmented at the first segmentation point 58-1 to obtain the first item segment 60-1 and the second item segment 60-2. The first item segment 60-1 can be stored to the first storage repository 20-1. The second item segment 60-2 can be segmented at the segmentation point 58-N to obtain the third item segment 60-3 and the fourth item segment 60-4. The third item segment 60-3 can be stored to the second storage repository 20-2, and the fourth item segment 60-4 can be stored to the $N^{th}$ storage repository 20-N.

Figure 3:
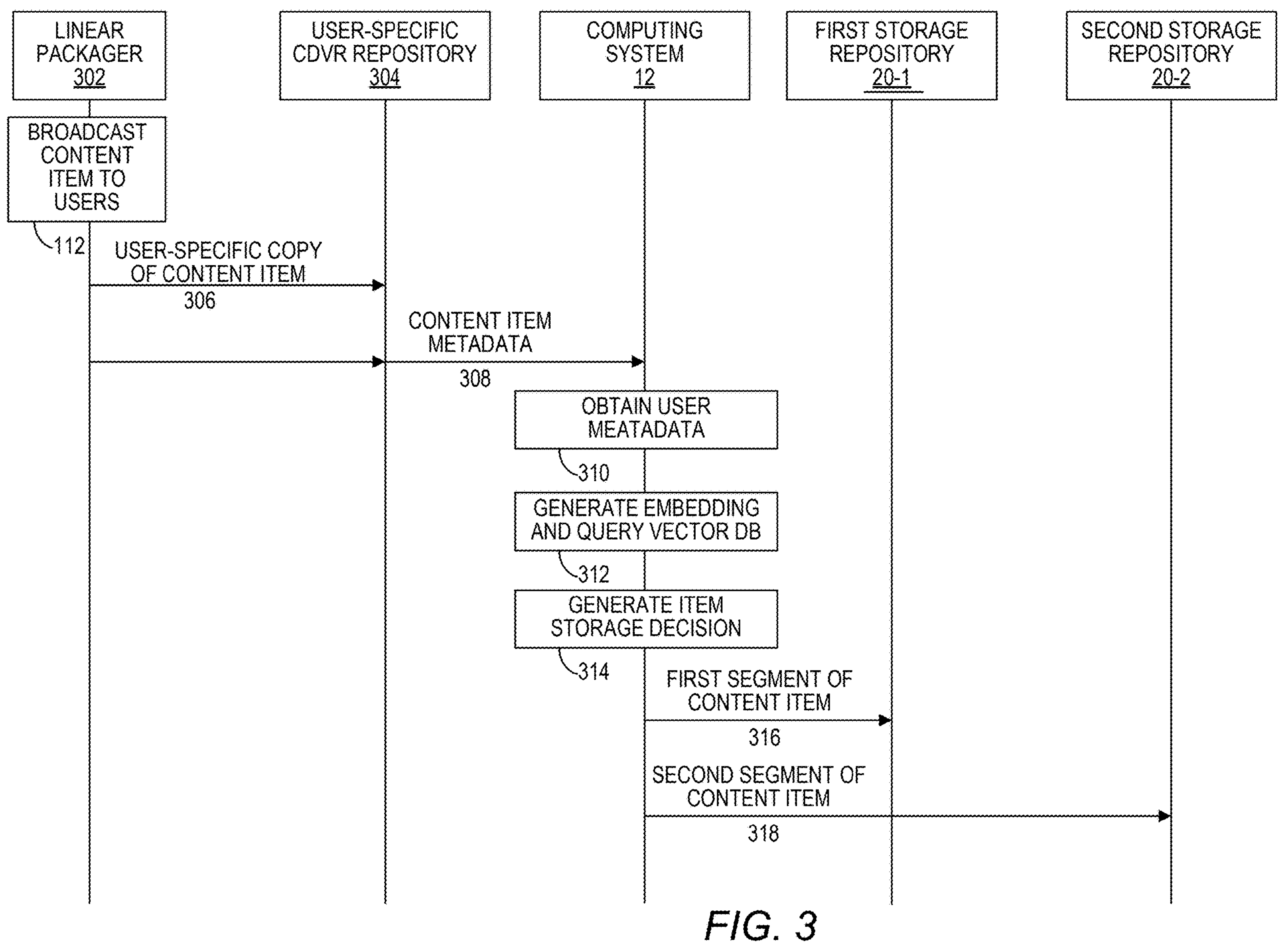
FIG. 3 is a communication flow diagram for facilitating segmentation and storage of content items with machine-learned models according to some implementations of the present disclosure.

FIG. 3 is a communication flow diagram for facilitating segmentation and storage of content items with machine-learned models according to some implementations of the present disclosure. FIG. 3 will be discussed in conjunction with FIGS. 1 and 2. More specifically, a linear packager 302 can be, or include, a collection of hardware and/or software resources configured to broadcast or otherwise distribute a content item to user devices associated with the content service. At 304, the linear packager 302 can broadcast the content item 24 to user devices, such as the user computing device 26.

At 306, the linear packager 302 can transmit a user-specific copy of the content item 24 to a user-specific CDVR repository 306. The user-specific CDVR repository 306 can be a repository in which copies of content items are stored for the user to enable CDVR functionality. As described previously, in some geographic areas, separate copies of the same content item are required to be stored for each user when providing CDVR services. As such, the repository can store copies of multiple content items that are copied and stored specifically for the user. However, it should be noted that the user-specific CDVR repository 306 does not necessarily refer to a discrete hardware resource, or even a discrete area of memory in a memory device. Rather, in some instances, the user-specific CDVR repository 306 may be implemented across a variety of distributed memory devices of a cloud computing service or the like.

At 308, the computing system 12 can receive the content item metadata 32 from the linear packager 302 and/or the user-specific CDVR repository 306. At 310, the computing system 12 can obtain the user metadata 30 (e.g., from a user metadata repository maintained by the content service, from the user computing device 26, etc.).

At 312, the computing system 12 can generate the query embedding(s) 40 and perform the vector similarity search on the vector embedding database 44 with the query embedding(s) 40 to retrieve the input contextual data element(s) 48.

At 314, the computing system 12 can generate the item storage decision output 54. At 316, based on the item storage decision output 54, the computing system 12 can transmit the first item segment 60-1 to the first storage repository 20-1 for storage. At 318, based on the item storage decision output 54, the computing system 12 can transmit the second item segment 60-2 to the second storage repository 20-2 for storage.

Figure 4:
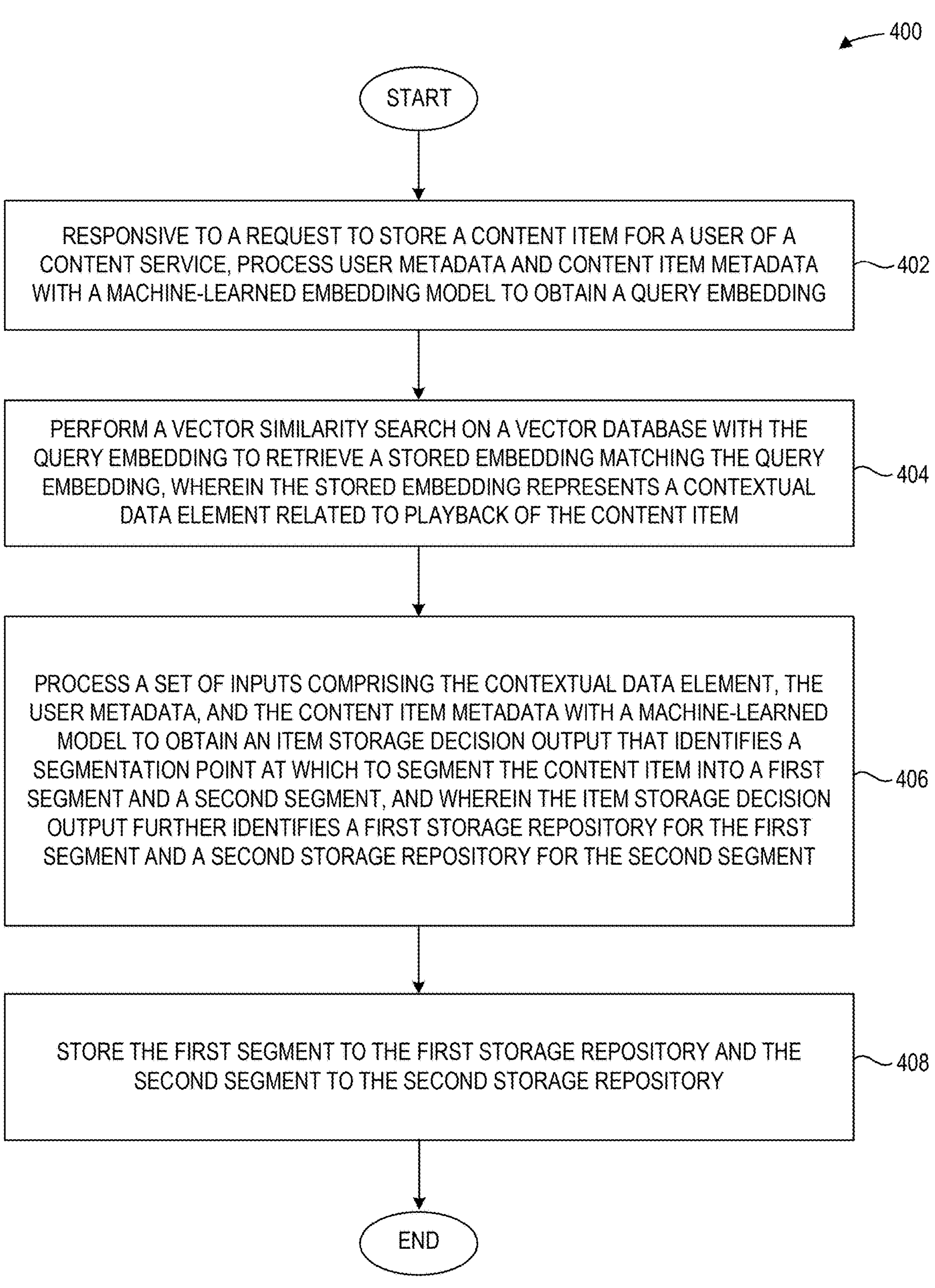
FIG. 4 depicts a flow chart diagram of an example method for segmentation and storage of content items with machine-learned models according to some implementations of the present disclosure.

FIG. 4 depicts a flow chart diagram of an example method 400 for segmentation and storage of content items with machine-learned models according to some implementations of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can, responsive to a request to store a content item for a user of a content service, process user metadata and content item metadata with a machine-learned embedding model to obtain a query embedding.

At 404, the computing system can perform a vector similarity search on a vector database with the query embedding to retrieve a stored embedding matching the query embedding. The stored embedding represents a contextual data element related to playback of the content item. In some implementations, to perform the vector similarity search on the vector database with the query embedding, the computing system can perform the vector similarity search on the vector database with the user query embedding to retrieve one or more stored user embeddings representing one or more user-related contextual data elements. The computing system can perform the vector similarity search on the vector database with the item query embedding to identify one or more stored item embeddings representing one or more item-related contextual data elements. The set of inputs can include the one or more user-related contextual data elements, the one or more item-related contextual data elements, the user metadata, and the content item metadata.

In some implementations, the user related contextual data elements can include information descriptive of aggregate playback behavior for a plurality of users of the content service, information descriptive of aggregate playback behavior for users of a particular user segment of the content service, wherein the user of the content service belongs to the particular user segment, and/or information descriptive of historical playback behavior for the user of the content service.

At 406, the computing system can process a set of inputs comprising the contextual data element, the user metadata, and the content item metadata with a machine-learned model to obtain an item storage decision output. The item storage decision output can identify a segmentation point at which to segment the content item into a first segment and a second segment. The item storage decision output further identifies a first storage repository for the first segment and a second storage repository for the second segment.

In some implementations, to process the set of inputs, the computing system can process the user metadata and the content item metadata with the machine-learned embedding model to obtain a joint query embedding that represents both the user-specific information and the item-specific information. To perform the vector similarity search on the vector database with the query embedding, the computing system can perform the vector similarity search on the vector database with the joint query embedding to retrieve the stored embedding that represents the contextual data element related to playback of the content item.

In some implementations, the computing system can process the user metadata with the machine-learned embedding model to obtain a user query embedding that represents the user metadata. The computing system can process the content item metadata with the machine-learned embedding model to obtain an item query embedding that represents the content item metadata.

In some implementations, prior to processing the user metadata and the content item metadata with the machine-learned embedding model, the computing system can receive the request to store the content item for the user of the content service. The request can include the user metadata, which can include segment identifying information that identifies the particular user segment to which the user belongs, location information for a user computing device associated with the user, and/or device information descriptive of a current state of the user computing device associated with the user.

In some implementations, the one or more item-related contextual data elements can include information descriptive of aggregate playback behavior for a plurality of content items provided by the content service, information descriptive of aggregate playback behavior for content items of a particular content segment of the content service, wherein the content item belongs to the particular content segment, or information descriptive of historical playback behavior for the content item.

In some implementations, prior to processing the user metadata and the content item metadata with the machine-learned embedding model, the computing system can obtain the content item metadata. The content item metadata can include item identifying information that identifies the particular content segment to which the content item belongs, review information descriptive of an aggregate score assigned to the content item, item type information indicative of a particular content type associated with the content item, temporal information descriptive of a seasonality of the content item and/or an expected playback time of the content item, and/or playback information descriptive of a playback duration for the content item.

At 408, the computing system can store the first segment to the first storage repository and the second segment to the second storage repository.

In some implementations, the computing system can receive, from a user computing device associated with the user of the content service, a content item retrieval request for the content item. The computing system can transmit, from the first storage repository, the first segment to the user computing device. The computing system can, concurrently with transmitting the first segment, retrieve the third segment from the second storage repository and the fourth segment from the third storage repository. The computing system can transmit the third segment and the fourth segment to the user computing device. In some implementations, to transmit the third segment and the fourth segment to the user computing device, the computing system can combine the third segment and the fourth segment.

Figure 5:
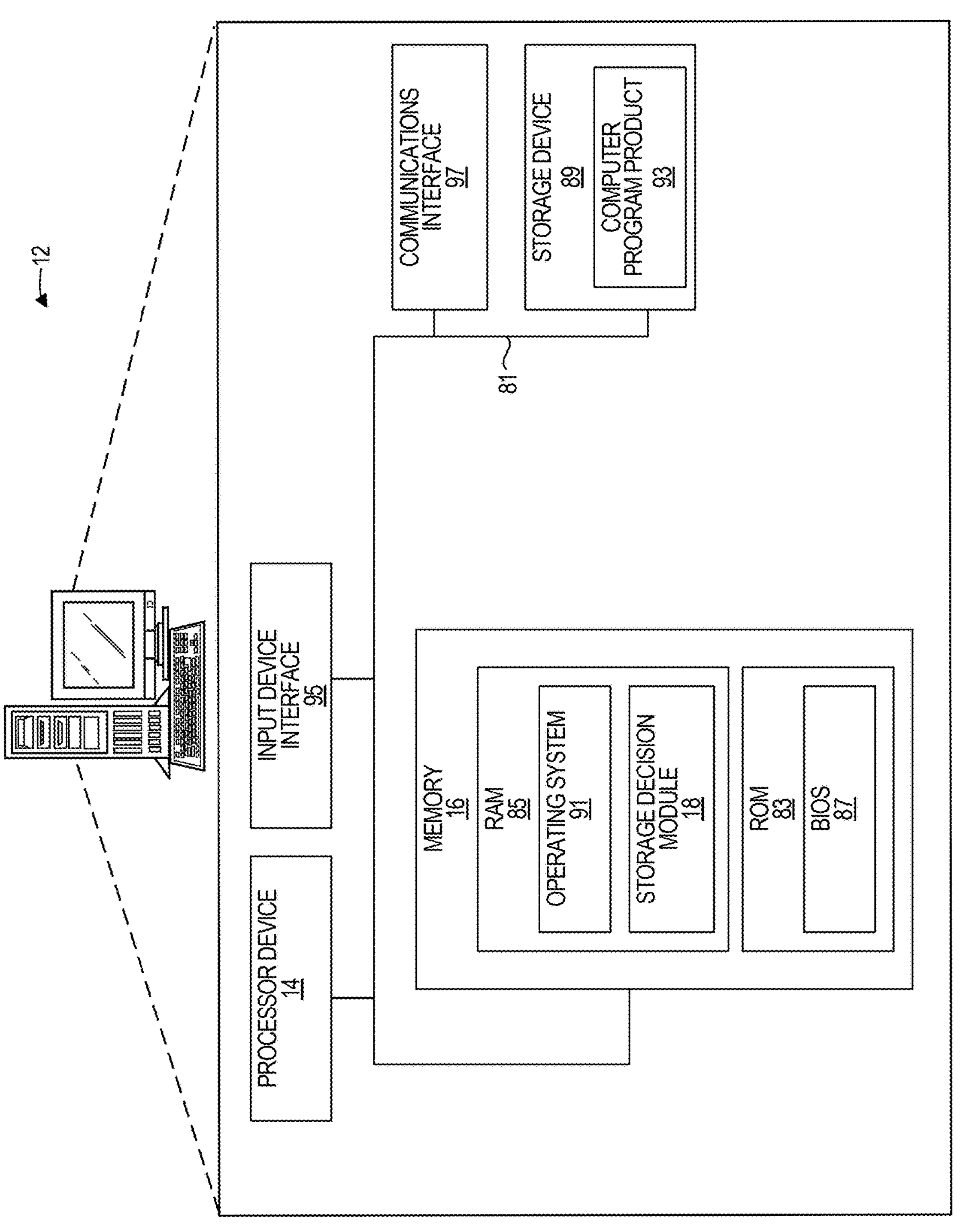
FIG. 5 is a block diagram of the computing system suitable for implementing examples according to one example.

FIG. 5 is a block diagram of the computing system 12 suitable for implementing examples according to one example. The computing system 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 12 includes the processor device(s) 14, the memory 16, and a system bus 81. The system bus 81 provides an interface for system components including, but not limited to, the memory 16 and the processor device(s) 14. The processor device(s) 14 can be any commercially available or proprietary processor.

The system bus 81 may be any of several types of bus structures that may further interconnect to a memory bus (with or without a memory controller), a peripheral bus, and/or a local bus using any of a variety of commercially available bus architectures. The memory 16 may include non-volatile memory 83 (e.g., read-only memory (ROM), erasable programmable read-only memory (EPROM), electrically erasable programmable read-only memory (EEPROM), etc.), and volatile memory 85 (e.g., random-access memory (RAM)). A basic input/output system (BIOS) 87 may be stored in the non-volatile memory 83 and can include the basic routines that help to transfer information between elements within the computing system 12. The volatile memory 85 may also include a high-speed RAM, such as static RAM, for caching data.

The computing system 12 may further include or be coupled to a non-transitory computer-readable storage medium such as the storage device 89, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 89 and other drives associated with computer-readable media and computer-usable media may provide non-volatile storage of data, data structures, computer-executable instructions, and the like.

A number of modules can be stored in the storage device 89 and in the volatile memory 85, including an operating system 91 and one or more program modules, such as the storage decision module 18, which may implement the functionality described herein in whole or in part. All or a portion of the examples may be implemented as a computer program product 93 stored on a transitory or non-transitory computer-usable or computer-readable storage medium, such as the storage device 89, which includes complex programming instructions, such as complex computer-readable program code, to cause the processor device(s) 14 to carry out the steps described herein. Thus, the computer-readable program code can comprise software instructions for implementing the functionality of the examples described herein when executed on the processor device(s) 14. The processor device(s) 14, in conjunction with the storage decision module 18 in the volatile memory 85, may serve as a controller, or control system, for the computing system 12 that is to implement the functionality described herein.

Because the storage decision module 18 is a component of the computing system 12, functionality implemented by the storage decision module 18 may be attributed to the computing system 12 generally. Moreover, in examples where the storage decision module 18 comprises software instructions that program the processor device(s) 14 to carry out functionality discussed herein, functionality implemented by the storage decision module 18 may be attributed herein to the processor device(s) 14.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 14 through an input device interface 95 that is coupled to the system bus 81 but can be connected by other interfaces such as a parallel port, an Institute of Electrical and Electronic Engineers (IEEE) 1394 serial port, a Universal Serial Bus (USB) port, an IR interface, and the like. The computing system 12 may also include the communications interface 97 suitable for communicating with the network as appropriate or desired. The computing system 12 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method comprising:

responsive to a request to store a content item for a user of a content service, processing, by a computing system comprising one or more processor devices, user metadata and content item metadata with a machine-learned embedding model to obtain a query embedding;

performing, by the computing system, a vector similarity search on a vector database with the query embedding to retrieve a stored embedding matching the query embedding, wherein the stored embedding represents a contextual data element related to playback of the content item;

processing, by the computing system, a set of inputs comprising the contextual data element, the user metadata, and the content item metadata with a machine-learned model to obtain an item storage decision output that identifies a segmentation point at which to segment the content item into a first segment and a second segment, and wherein the item storage decision output further identifies a first storage repository for the first segment and a second storage repository for the second segment; and storing, by the computing system, the first segment to the first storage repository and the second segment to the second storage repository.

2. The method of claim 1, wherein processing the user metadata and the content item metadata with the machine-learned embedding model to obtain the query embedding comprises:

processing, by the computing system, the user metadata and the content item metadata with the machine-learned embedding model to obtain a joint query embedding that represents both the user metadata and the content item metadata; and wherein performing the vector similarity search on the vector database with the query embedding comprises:

performing, by the computing system, the vector similarity search on the vector database with the joint query embedding to retrieve the stored embedding matching the joint query embedding, wherein the stored embedding represents the contextual data element related to playback of the content item.

3. The method of claim 1, wherein processing the user metadata and the content item metadata with the machine-learned embedding model to obtain the query embedding comprises:

processing, by the computing system, the user metadata with the machine-learned embedding model to obtain a user query embedding that represents the user metadata; and processing, by the computing system, the content item metadata with the machine-learned embedding model to obtain an item query embedding that represents the content item metadata.

4. The method of claim 3, wherein querying the vector database with the query embedding comprises:

performing, by the computing system, a first vector similarity search, on the vector database with the user query embedding to retrieve one or more stored user embeddings matching the user query embedding, wherein the one or more stored user embeddings represent one or more user-related contextual data elements; and performing, by the computing system, a second vector similarity search on the vector database with the item query embedding to retrieve one or more stored item embeddings matching the item query embedding, wherein the one or more stored item embeddings represent one or more item-related contextual data elements; and wherein the set of inputs comprises the one or more user-related contextual data elements, the one or more item-related contextual data elements, the user metadata, and the content item metadata.

5. The method of claim 4, wherein the one or more user-related contextual data elements comprise at least one of:

information descriptive of aggregate playback behavior for a plurality of users of the content service;

information descriptive of aggregate playback behavior for users of a particular user segment of the content service, wherein the user of the content service belongs to the particular user segment; or information descriptive of historical playback behavior for the user of the content service.

6. The method of claim 5, wherein, prior to processing the user metadata and the content item metadata with the machine-learned embedding model, the method comprises:

receiving, by the computing system, the request to store the content item for the user of the content service, wherein the request comprises the user metadata, and wherein the user metadata comprises at least one of:

segment identifying information that identifies the particular user segment to which the user belongs;

location information for a user computing device associated with the user; or device information descriptive of a current state of the user computing device associated with the user.

7. The method of claim 4, wherein the one or more item-related contextual data elements comprise at least one of:

information descriptive of aggregate playback behavior for a plurality of content items provided by the content service;

information descriptive of aggregate playback behavior for content items of a particular content segment of the content service, wherein the content item belongs to the particular content segment; or information descriptive of historical playback behavior for the content item.

8. The method of claim 7, wherein, prior to processing the user metadata and the content item metadata with the machine-learned embedding model, the method comprises:

obtaining, by the computing system, the content item metadata, wherein the content item metadata comprises at least one of:

item identifying information that identifies the particular content segment to which the content item belongs;

review information descriptive of an aggregate score assigned to the content item;

item type information indicative of a particular content type associated with the content item;

temporal information descriptive of a seasonality of the content item and/or an expected playback time of the content item; or playback information descriptive of a playback duration for the content item.

9. The method of claim 8, wherein the particular content type comprises:

a Virtual Reality (VR)/Augmented Reality (AR) content type;

an audiovisual content type;

a video game content type;

a video-on-demand content type; or a cloud digital video recording (cDVR) content type.

10. The method of claim 1, wherein the set of inputs further comprises prompt information, comprising:

instructions to minimize a total storage cost associated with storing the content item; and cost information descriptive of a plurality of storage costs respectively associated with a plurality of candidate storage repositories comprising the first storage repository and the second storage repository.

11. The method of claim 1, wherein the item storage decision output identifies:

a first segmentation point at which to segment the content item into the first segment and the second segment; and a second segmentation point at which to segment the second segment into a third segment and a fourth segment; and wherein the item storage decision output further identifies the second storage repository for the third segment and a third storage repository for the fourth segment.

12. The method of claim 11, wherein storing the first segment to the first storage repository and the second segment to the second storage repository comprises:

storing, by the computing system, the first segment to the first storage repository, the third segment to the second storage repository, and the fourth segment to the third storage repository.

13. The method of claim 12, wherein the method further comprises:

receiving, by the computing system from a user computing device associated with the user of the content service, a content item retrieval request for the content item;

transmitting, by the computing system from the first storage repository, the first segment to the user computing device;

concurrently with transmitting the first segment, retrieving, by the computing system, the third segment from the second storage repository and the fourth segment from the third storage repository; and transmitting, by the computing system, the third segment and the fourth segment to the user computing device.

14. The method of claim 13, wherein transmitting the third segment and the fourth segment to the user computing device comprises:

combining, by the computing system, the third segment and the fourth segment.

15. A computing system comprising:

a memory;

one or more processor devices configured to:

responsive to a request to store a content item for a user of a content service, process user metadata and content item metadata with a machine-learned embedding model to obtain a query embedding;

perform a vector similarity search on a vector database with the query embedding to retrieve a stored embedding matching the query embedding, wherein the stored embedding represents a contextual data element related to playback of the content item;

process a set of inputs comprising the contextual data element, the user metadata, and the content item metadata with a machine-learned model to obtain an item storage decision output that identifies a segmentation point at which to segment the content item into a first segment and a second segment, and wherein the item storage decision output further identifies a first storage repository for the first segment and a second storage repository for the second segment; and store the first segment to the first storage repository and the second segment to the second storage repository.

16. The computing system of claim 15, wherein, to process the user metadata and the content item metadata with the machine-learned embedding model to obtain the query embedding, the one or more processor devices are to:

process the user metadata and the content item metadata with the machine-learned embedding model to obtain a joint query embedding that represents both the user metadata and the content item metadata; and wherein, to query the vector database with the query embedding, the one or more processor devices are to:

perform the vector similarity search on the vector database with the joint query embedding to retrieve the stored embedding matching the joint query embedding, wherein the stored embedding represents the contextual data element related to playback of the content item.

17. The computing system of claim 15, wherein, to process the user metadata and the content item metadata with the machine-learned embedding model to obtain the query embedding, the one or more processor devices are to:

process the user metadata with the machine-learned embedding model to obtain a user query embedding that represents the user metadata; and process the content item metadata with the machine-learned embedding model to obtain an item query embedding that represents the content item metadata.

18. The computing system of claim 17, wherein, to query the vector database with the query embedding, the one or more processor devices are to:

perform a first vector similarity search on the vector database with the user query embedding to retrieve one or more stored user embeddings matching the user query embedding, wherein the one or more stored user embeddings represent one or more user-related contextual data elements; and perform a second vector similarity search on the vector database with the item query embedding to retrieve one or more stored item embeddings matching the item query embedding, wherein the one or more stored item embeddings represent one or more item-related contextual data elements; and wherein the set of inputs comprises the one or more user-related contextual data elements, the one or more item-related contextual data elements, the user metadata, and the content item metadata.

19. The computing system of claim 18, wherein the one or more user-related contextual data elements comprise at least one of:

information descriptive of aggregate playback behavior for a plurality of users of the content service;

information descriptive of aggregate playback behavior for users of a particular user segment of the content service, wherein the user of the content service belongs to the particular user segment; or information descriptive of historical playback behavior for the user of the content service.

20. A non-transitory computer-readable storage medium that includes executable instructions to cause one or more processor devices to:

responsive to a request to store a content item for a user of a content service, process user metadata and content item metadata with a machine-learned embedding model to obtain a query embedding;

perform a vector similarity search on a vector database with the query embedding to retrieve a stored embedding matching the query embedding, wherein the stored embedding represents a contextual data element related to playback of the content item;

process a set of inputs comprising the contextual data element, the user metadata, and the content item metadata with a machine-learned model to obtain an item storage decision output that identifies a segmentation point at which to segment the content item into a first segment and a second segment, and wherein the item storage decision output further identifies a first storage repository for the first segment and a second storage repository for the second segment; and store the first segment to the first storage repository and the second segment to the second storage repository.

* * * * *